3,847,960
ORGANIC COMPOUNDS
Lajos Avar, Binningen, Basel-Land, Kurt Hofer, Munchenstein, Basel-Land, and Martin Preiswerk, Basel, Switzerland, assignors to Sandoz Ltd., also known as Sandoz AG, Basel, Switzerland
No Drawing. Filed Apr. 9, 1973, Ser. No. 349,641
Claims priority, application Switzerland, Apr. 13, 1972, 5,481/72
Int. Cl. C07j 15/04, 1/08, 3/06
U.S. Cl. 260—439 R                    19 Claims

ABSTRACT OF THE DISCLOSURE

The invention relates to hydroxamate stabilizers of formula I,

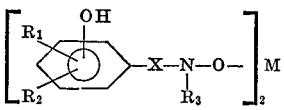    I in which $R_1$ signifies a tertiary alkyl radical in an ortho position to the hydroxyl group, $R_2$ signifies a hydrogen atom, a cycloalkyl, cycloalkylalkyl, aralkyl, alkylcycloalkyl or a substituted or unsubstituted phenyl radical, $R_3$ signifies a hydrogen atom, an alkyl radical or a substituted or unsubstituted phenyl or naphthyl radical, X signifies

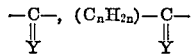

or

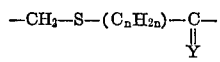

where Y signifies an oxygen or a sulphur atom and
M signifies a divalent nickel, zinc, copper or manganese ion.

The compounds of formula I are indicated for use as stabilizers for organic materials against light, heat and oxygen degradation.

---

The present invention relates to the production of hydroxamates.

More particularly, the present invention provides a hydroxamate of formula I,

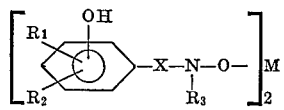    I in which $R_1$ signifies a tertiary alkyl radical of 4 to 14 carbon atoms or a tertiary cycloalkyl radical of up to 14 carbon atoms and containing 5 to 7 ring carbon atoms, which tertiary alkyl radical or tertiary cycloalkyl radical is in an ortho position to the hydroxyl group, $R_2$ signifies a hydrogen atom, an alkyl radical of 1 to 20 carbon atoms, an alkoxy radical of 1 to 20 carbon atoms, a cycloalkylalkyl radical of up to 20 carbon atoms, an aralkyl radical of up to 20 carbon atoms, a cycloalkyl radical, an alkylcycloalkyl radical of up to 20 carbon atoms, an unsubstituted phenyl radical or a phenyl radical substituted by 1 or 2 alkyl radicals of 1 to 6 carbon atoms, any cycloalkyl moiety or radical having 5 to 7 ring carbon atoms, $R_3$ signifies a hydrogen atom, an alkyl radical of 4 to 8 carbon atoms, an unsubstituted phenyl or naphthyl radical or a phenyl or naphthyl radical substituted by up to 2 alkyl radicals of 1 to 6 carbon atoms or by up to two halogen atoms, cyano or nitro groups, X signifies

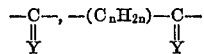

or

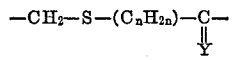

where Y signifies an oxygen or sulphur atom and
$n$ signifies 1, 2, 3, 4, 5 or 6, and
M signifies a divalent nickel, zinc, copper or manganese ion.

The present invention also provides a process for the production of compounds of formula I, as defined above, characterized by reacting a hydroxamic acid of formula II,

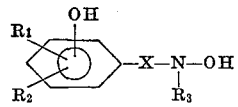    II wherein $R_1$, $R_2$, $R_3$ and X are as defined above, or a soluble salt thereof, with a divalent nickel, zinc, copper or manganese salt.

Suitably, the process is carried out by reacting 2 moles of a compound of formula II, as defined above, with 1 mole of a divalent nickel, zinc, copper or manganese salt.

Suitable salts of hydroxamic acids are the alkali and alkaline-earth salts, in particular, lithium, sodium and potassium salts.

Suitable divalent metal salts include nickel, zinc, copper and manganese salts of organic and inorganic acids, for example, chlorides, sulphates, benzenesulphonates, acetates, formates, benzoates and carbonates.

Advantageously, the reaction is carried out in a solvent medium in which the starting materials are in solution or suspension. For production cost reasons water is preferred, although the reaction may also be carried out in other solvents, for example, lower alcohols, e.g. of 1 to 4 carbon atoms, glycols or phenol.

Preferably, the reaction is carried out by reacting an alkali metal salt of a hydroxamic acid of formula II, as defined above, with a water-soluble divalent nickel, zinc, manganese or copper salt in aqueous medium. Reaction of the soluble starting materials leads to the formation of an insoluble hydroxamate of formula I, which can be isolated and purified, for example by filtration, in conventional manner.

Where $R_1$ signifies a tertiary alkyl radical in the compound of formula I, suitable radicals include, for example, tertiary butyl, 2-methyl-2-butyl, 2,3-dimethyl-2-butyl, 2-methyl-2-pentyl, 3-methyl-3-pentyl, 3-ethyl-3-pentyl, 2,4-dimethyl-2-pentyl, 2-methyl-2-hexyl, 3-methyl-3-hexyl, 3,4-dimethyl-3-hexyl, 3,5-dimethyl-3-hexyl, 2-methyl-2-heptyl, 3-methyl-3-heptyl, 4-methyl-4-heptyl, 2,3,4-trimethyl-3-pentyl, 2,4,4-trimethyl-2-pentyl, 3-ethyl-3-heptyl, 2-methyl-2-octyl or 4-methyl-4-octyl. Where $R_1$ signifies a tertiary cycloalkyl radical, suitable tertiary alkyl radicals include 1-methyl-cyclopentyl, 1-methyl-cyclohexyl, 1-methyl-cycloheptyl, 1-propyl-cyclopentyl and 1-butyl-cyclopentyl. Preferably, $R_1$ signifies a tertiary alkyl radical containing 4 to 6 carbon atoms, and more preferably signifies a tertiary butyl or tertiary amyl radical.

Any alkyl radicals as $R_2$ in the compounds of formula I may be primary, secondary or tertiary, linear or branched. Examples of suitable primary alkyl radicals as $R_2$ include methyl, ethyl, propyl, butyl, pentyl, hexyl, and unbranched alkyl radicals with up to 20 carbon atoms.

Examples of secondary alkyl radicals are isopropyl, 2-butyl, 3-methyl-2-butyl, 2-pentyl, 2,2-dimethyl-3-butyl, 2-hexyl, 3-hexyl, 2-methyl-3-pentyl, 3-methyl-2-pentyl, 4-methyl-2-pentyl, 2,2-dimethyl - 3 - pentyl, 2,4-dimethyl-3-pentyl, 2-heptyl, 3-heptyl, 4-heptyl, 2-methyl-3-hexyl, 4-methyl-3-hexyl, 5-methyl-3-hexyl, 3-ethyl-4-hexyl, 2,2-dimethyl-3-hexyl, 2,4-dimethyl - 3 - hexyl, 2,5-dimethyl-3-hexyl, 3,4-dimethyl-2-hexyl, 2-methyl-3-heptyl, 3-methyl-2-heptyl, 3-methyl-4-heptyl, 4-methyl-3-heptyl, 5-methyl-3-heptyl, 6-methyl-2-heptyl, 2-octyl, 3-octyl, 4-octyl, 2,2,4-trimethyl-3-pentyl, 5-ethyl-2-heptyl, 2,2-dimethyl-3-heptyl, 2,6-dimethyl-4-heptyl, 2-methyl-3-octyl, 3-methyl-4-octyl, 6-ethyl-3-octyl, 2-decyl, 5-decyl, 2,2-dimethyl-3-octyl, 2-methyl-4-nonyl, 3-methyl-4-nonyl, 6-ethyl-3-decyl, 7-ethyl-2-methyl-4-nonyl, 2-dodecyl, 2,6,8-trimethyl-4-nonyl, 2-tridecyl, 2-tetradecyl, 2-pentadecyl, 2-hexadecyl and 2-nonadecyl.

Examples of tertiary alkyl radicals as $R_2$ include the tertiary alkyl radicals given above as $R_1$. Examples of branched radicals as $R_2$ include 2-methyl-1-propyl, 2,2-dimethyl-1-propyl, 2-methyl-1-butyl, 2-ethyl-1-butyl, 2,2-dimethyl-1-butyl, 2-methyl-1-pentyl, 3-methyl-1-pentyl, 4-methyl-1-pentyl, 2,4-dimethyl-1-pentyl, 2-ethyl-1-hexyl, 2,2-dimethyl-1-hexyl, 2,2,4-trimethyl-1-pentyl, 4-methyl-2-propyl-1-pentyl, 3,7-dimethyl-1-octyl and 2,2-dimethyl-1-decyl.

Where $R_2$ is a cycloalkyl, an alkylcycloalkyl or a cycloalkylalkyl radical, it may signify, for example, cyclopentyl, cyclohexyl, cycloheptyl, 2-, 3- or 4-methylcyclohexyl, cyclooctyl, 2,5-, 2,6-, 3,4- or 3,5-dimethyl-cyclohexyl, 1-cyclohexylpropyl, 2-propyl-cyclohexyl, 3,3,5-trimethylcyclohexyl, 2-butylcyclohexyl, 4-tert. butyl-cyclohexyl, 3-methyl - 6 - isopropylcyclohexyl cyclododecyl, cyclohexylmethyl, 2-cyclohexylethyl, cycloheptylmethyl, 3-cyclohexylpropyl, cyclooctylmethyl, cycloundecylmethyl or cyclododecylmethyl.

Where $R_2$ signifies an aralkyl radical, this is preferably benzyl or phenylethyl. Where $R_2$ signifies an alkoxy radical, in place of the above named alkyl radicals the corresponding alkoxy radicals may be given.

Preferably, $R_2$ signifies one of the aforenamed radicals with up to 9 carbon atoms; more preferably $R_2$ signifies those radicals indicated above for $R_1$ and in particular signifies tertiary butyl.

Where $R_3$ in the compound of formula I signifies a substituted phenyl or naphthyl radical, the preferred halogen substituent is chlorine or bromine.

Where $R_3$ signifies a phenyl or naphthyl substituted by up to two alkyl radicals containing 1 to 6 carbon atoms, any of those named above for $R_1$ and $R_2$ which contain up to 6 carbon atoms may be given.

Where $R_3$ signifies an alkyl radical, any of the radicals named above for $R_1$ and $R_2$ which are of 4 to 8 carbon atoms may be given. Preferably $R_3$ signifies a hydrogen atom or an unsubstituted phenyl radical.

In the compounds of formula I where X signifies

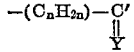

the following alkyl radicals may be instanced as suitable examples of —$(C_nH_{2n})$— methylene, ethylene, 1,2-propylene, 1,3-propylene, 1,4-butylene.

Representative hydroxamates of formula I include compounds of formula I',

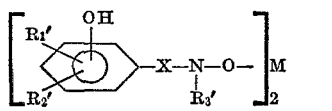

in which $R_1'$ signifies a tertiary alkyl radical of 4 to 6 carbon atoms,
$R_2'$ signifies a hydrogen atom, an alkyl or alkoxy, unsubstituted phenyl, cycloalkyl, alkylcycloalkyl, cycloalkylalkyl, aralkyl radical, or a mono or disubstituted phenyl radical containing up to 9 carbon atoms, which alkyl, alkoxy, alkylcycloalkyl, cycloalkylalkyl or aralkyl radical contains up to 9 carbon atoms and any cycloalkyl moiety or radical contains 5 to 7 ring carbon atoms,
$R_3'$ signifies a hydrogen atom, an alkyl radical of 4 to 8 carbon atoms, an unsubstituted phenyl or naphthyl radical or a phenyl or naphthyl radical substituted by up to 2 alkyl radicals of 1 to 6 carbon atoms or by up to two chlorine or bromine atoms, cyano or nitro groups, and
X and M are as defined above.

Preferably, $R_2'$ signifies a hydrogen atom or an alkyl or alkoxy radical of up to 9 carbon atoms.

Preferred compounds of formula I include those of formula I''.

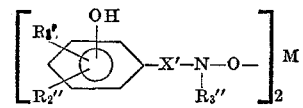

in which $R_1'$ is as defined above,
$R_2''$ a tertiary alkyl radical of 4 to 6 carbon atoms or a methyl radical,
$R_3''$ signifies a hydrogen atom or an unsubstituted phenyl radical,
$X'$ signifies

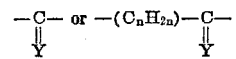

where y and n are as defined above, and
M is as defined above.

In the compounds of formula I'', $R_1'$ preferably signifies a tertiary amyl or a tertiary butyl radical, more preferably $R_1'$ signifies a tertiary butyl radical and $R_2''$ preferably signifies a tertiary butyl, a tertiary amyl or a methyl radical, more preferably $R_2$ signifies a tertiary butyl or a methyl radical. Preferably n is 1 or 2.

Even more preferred compounds of formula I include those of formula I''',

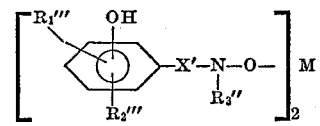

in which $R_1'''$ and $R_2'''$ are the same and each signifies a tertiary butyl radical,
$R_3''$ signifies a hydrogen atom or an unsubstituted phenyl radical,
$X'$ signifies

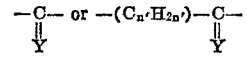

where y is as defined above,
n' signifies 1 or 2, and
M is as defined above.

The compounds of formula II are new and may be obtained by reaction of an acid of formula III or formula IV,

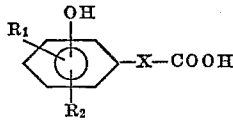 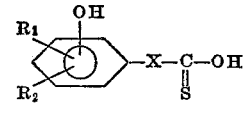

III                      IV where $R_1$, $R_2$ and X have the significations defined above, or a functional derivative thereof, with a compound of formula V, $$R_3—NH—OH \qquad V$$

in which $R_3$ is as defined above, for example, hydroxylamine or N-phenylhydroxylamine. As examples of functional derivatives of acids of formulae III and IV, may be given the chlorides and, particularly for reaction with hydroxylamine, the esters formed with lower alcohols, such as the methyl, ethyl, propyl and butyl esters, the methyl ester being preferred.

The compounds of formula I are indicated for use as stabilizers against light, oxygen and heat degradation. For this purpose they are incorporated in materials which are sensitive to light, oxygen and heat, or applied to these materials to form a protective surface film. A suitable test for stabilization against light degradation is where organic materials containing a compound of formula I are tested in a Klimatest apparatus by the De La Rue method at 40° C. and 75% relative humidity, with thorough ventilation and irradiation by 16 sun lamps and 16 black lamps. By their stabilizing action they protect sensitive substances against degradation. They have a wide area of application in plastics technology, being suitable, for example, as stabilizers for the following materials: cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon, rubber, cellulose propionate, melamine-formaldehyde resins, urea-formaldehyde resins, allyl casting resins, polymethyl methacrylate, polyesters, polyacrylonitrile, and the corresponding copolymers. The disclosed compounds are also suitable for the stabilization of natural products such as rubber, cellulose, wool and silk. The materials for stabilization may be in the form of film or sheet, tapes, rod, panels, coatings, fibres, granules, powders or other solid forms, or in the form of solutions, emulsions or dispersions. The compounds are incorporated in or coated on the materials by standard methods. An important method of incorporation consists in intimately mixing the stabilizing compound with a plastics material, for instance polypropylene granules, in a kneader or other suitable machine, followed by extrusion moulding. With this method homogeneous distribution is obtained, which is important for good protection. The material may be extruded, for example, in the form of film, tubing or as filament. The latter may be converted into textiles. In this method of application the stabilizer is incorporated in the polypropylene prior to textile production. Textile yarns and fabrics also can be treated with the new stabilizers, for example, from an aqueous medium containing the finely dispersed compound of formula I, in conventional manner, for example by immersion or spraying. Textiles of polyethylene terephthalate and cellulose acetate fibres are particularly suitable for this method of application.

Synthetic polymeric materials need not necessarily be in the final form when the new compounds are incorporated for stabilization. The compounds can be mixed with the monomers or prepolymers prior to the condensation or other polymerization reaction giving the final polymer.

Besides being suitable for the stabilization of clear films, plastics and the like, the new compounds are applicable in opaque, semi-opaque and translucent materials with a surface susceptible to degradation by ultra-violet radiation, air and heat. Examples of such materials are foam plastics, opaque films and coatings, opaque papers, opaque and transparent pigmented plastics, fluorescent pigments, automobile and furniture polishes, creams, lotions and related products, which may be either opaque, clear or translucent.

It is thought that the effectiveness of the compounds of formula I as stabilizers for organic materials is due to the presence in the molecule of the hydroxamic acid structure in the form of a heavy metal salt and a sterically hindered phenolic hydroxyl group.

Furthermore, it may be mentioned that extremely good stabilization is evident in polyvinyl chloride and polyolefins where the compounds of formula I bear saturated aliphatic groups.

The compounds of formula I may be incorporated in organic materials at any stage of processing using normal methods. The amounts used may vary within the limits, depending, for example, on the substrate and the particular compound used, for example, between 0.01 and 5%, or preferably 0.05 and 1%, in relation to the weight of the organic material for protection.

The stabilized organic materials may contain compounds of formula I only, or these compounds together with other additives to improve the properties of the material, for example, ultra-violet absorbers and stabilizers against degradation by heat and oxygen. Examples of the latter products include 2-hydroxy-benzophenones, 1,2,3-triazoles, organic sulphur, tin and trivalent phosphorus compounds, and nickel salts of organic carboxylic acids. Such stabilizer mixtures often provide extremely good stabilization owing to their synergistic action.

The following Examples further illustrate the invention. The parts and percentages are by weight and the temperatures are in degrees centigrade.

Examples of the Production of Hydroxamic Acids of Formula II

Example a

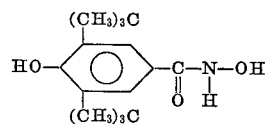

3.5 parts of hydroxylamine hydrochloride and 5.3 parts of sodium carbonate are stirred in 150 parts of ether and 25 parts of water. At 20–25° a solution of 13.4 parts of 3,5-ditertiary butyl-4-hydroxybenzoic chloride in 100 parts of ether is slowly added. Stirring is continued until no further acid chloride is indicated. After elimination of the solvent by vacuum distillation, the solid crude product is obtained in a yield of 17 parts. For purification it is triturated with water, filtered, dried and recrystallized from benzene-petroleum ether. The colourless 3,5-di-tertiary butyl - 4 - hydroxybenzohydroxamic acid with melting point 189–190° is obtained. The analytically determined content of C, H, N and O agrees with the calculated theoretical values.

Example b

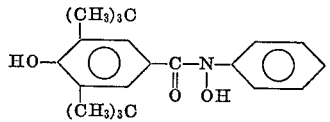

The procedure of Example a is employed, with the hydroxylamine hydrochloride replaced by the equivalent amount of N-phenyl hydroxyamine. The crude product is recrystallized twice from benzene-petroleum ether, on which the pure N-phenyl-3,5-di-tertiary butyl-4-hydroxybenzohydroxamic acid is obtained in the form of yellowish crystals, which melt at 105–107°.

Example c

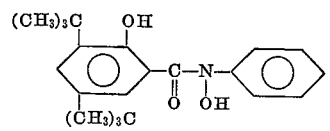

10.9 parts of N-phenylhydroxylamine and 12.6 parts of sodium hydrogen carbonate are stirred into 150 parts of ether and 25 parts of water. With external cooling from an ice bath, a solution of 26.8 parts of 3,5-di-tertiary butyl salicylic chloride in 100 parts of ether is slowly added. When all the acid chloride has reacted the reaction solution is concentrated by evaporation under vacuum, which leaves 35 parts of a dark oil. By trituration with 200 parts of saturated sodium hydrogen carbonate solution the oil is converted into a crude crystalline product, which is recrystallized from benzene-petroleum ether. The colourless crystals obtained melt at 114–115°. Elementary analysis demonstrates that the product is pure N-phenyl-3,5-di-tertiary butyl salicylic hydroxamic acid.

Examples of the Production of Hydroxamates of Formula I

Example 1

3.4 parts of N-phenyl-3,5-di-tertiary butyl salicylic hydroxamic acid (see Example c) are dissolved in 50 parts of ethanol and converted into the potassium salt with the equivalent amount of saturated potassium hydroxide solution. At 40° a solution of 1.2 parts of nickel chloride hexahydrate in 50 parts of ethanol is added slowly with stirring to the resulting yellowish solution. After a short time the double reaction is complete, with formation of potassium chloride and the nickel salt of formula

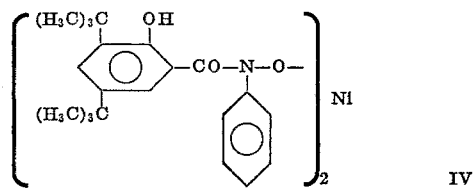

IV

The nickel salt settles out of the reaction solution in the form of a green precipitate. For purification it is washed with water and then with ethanol, dried, and treated in boiling petroleum ether. After separation of the petroleum ether by filtration, 3 parts by weight of the pure nickel salt are obtained in the form of a green crystalline powder.

Calculated (percent): C, 68.2; H, 7.1; N, 3.8; Me, 7.9. Found (percent): C, 68.6; H, 7.3; N, 3.7; Me, 7.3.

The zinc salt is produced in an analogous manner.

Example 2

In analogy with the procedure of Example 1, the double reaction of 2 mols of N-phenyl-3,5-di-tertiary butyl-4-hydroxybenzohydroxamic acid in the form of an alkali salt with 1 mol of nickel, zinc or manganese chloride (or sulphate) yields the salts of the following formula

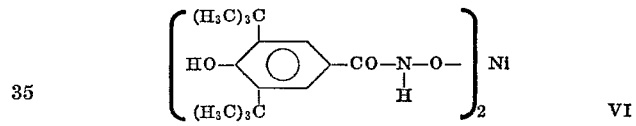

V where Me signifies nickel, zinc or manganese.

|  | Analyses | | | |
| --- | --- | --- | --- | --- |
|  | C | H | N | Ni |
| Nickel salt: | | | | |
| Calculated | 68.2 | 7.1 | 3.8 | 7.9 |
| Found | 68.2 | 7.3 | 3.8 | 7.5 |
| Zinc salt: | | | | |
| Calculated | 67.6 | 7.0 | 3.8 | 8.8 |
| Found | 67.3 | 7.1 | 3.8 | 9.3 |
| Manganese salt: | | | | |
| Calculated | 68.6 | 7.1 | 3.8 | 7.5 |
| Found | 68.8 | 7.4 | 4.0 | 5.0 |

Example 3

2.7 parts of 3,5-di-tertiary butyl-4-hydroxybenzohydroxamic acid (see Example a) are dissolved in 50 parts of ethanol and converted into the potassium salt with the equivalent amount of saturated potassium hydroxide solution. The colourless solution obtained is stirred at 40° and set slowly with a solution of 1.2 parts of nickel chloride hexahydrate in 50 parts of ethanol. After a short time the double reaction is complete with the formation of potassium chloride and the nickel salt of formula $$\left[ HO-\underset{(H_3C)_3C}{\overset{(H_3C)_3C}{\bigcirc}}-CO-\underset{H}{N}-O- \right]_2 Ni$$

VI

The nickel salt settles out of the reaction solution in the form of a pale beige brown precipitate. This is purified by washing with water and then with ethanol, and after drying by treatment in boiling petroleum ether. The petroleum ether is filtered off leaving 2.45 parts of the pure nickel salt in the form of a pale beige brown crystalline powder, which melts at 200°. The analytically determined content of C, H, N and Ni agrees with the values calculated from the above formula.

*Analysis.* — Calculated (percent): C, 61.3; H, 7.6; N, 4.8; Ni, 10.0. Found (percent): C, 61.4; H, 7.6; N, 4.6; Ni, 9.5.

Further compounds which can be produced in accordance with the preceding Examples are listed in Table 1.

TABLE 1

$$\left[ \underset{HO}{\underset{R_2}{\bigcirc}} \underset{R_1}{\overset{}{}}-X-\underset{R_3}{N}-O- \right]_2 Me$$

| Ex. No. | $R_1$ | $R_2$ | Position of OH | X | $R_3$ | Me | Production |
| --- | --- | --- | --- | --- | --- | --- | --- |
| 4 | 3-tert. butyl- | 5-tert. butyl- | 2 | —C(=O)— | Phenyl- | Zn | Analogously to Ex. 1. |
| 5 | do | do | 2 | Same as above | H | Ni | Analogously to Ex. 3. |
| 6 | do | do | 4 | —(CH$_2$)$_2$—C(=O)— | Phenyl- | Ni | Analogously to Ex. 1. |
| 7 | do | do | 4 | Same as above | H | Ni | Analogously to Ex. 3. |
| 8 | do | do | 4 | do | H | Zn | Do. |
| 9 | do | 5-methyl- | 4 | —C(=O)— | H | Ni | Do. |
| 10 | do | 5-tert. butyl- | 4 | Same as above | H | Ni | Do. |
| 11 | do | do | 4 | —O—S(=O)— | H | Ni | Do. |

Application Example A

Unstabilized polypropylene and 0.5% of a compound of Example 2 are homogeneously kneaded on a roll mill at 180°. The mixture is extrusion moulded as film of 0.3 mm. thickness.

What is claimed is:

1. A compound of formula I,

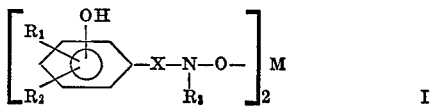

in which
R₁ signifies a tertiary alkyl radical of 4 to 14 carbon atoms or a tertiary cycloalkyl radical of up to 14 carbon atoms and containing 5 to 7 ring carbon atoms, which tertiary alkyl radical or tertiary cycloalkyl radical is in an ortho position to the hydroxyl group, R₂ signifies a hydrogen atom, an alkyl radical of 1 to 20 carbon atoms, an alkoxy radical of 1 to 20 carbon atoms, a cycloalkylalkyl radical of up to 20 carbon atoms, an aralkyl of up to 20 carbon atoms, a cycloalkyl radical, an alkylcycloalkyl radical of up to 20 carbon atoms, an unsubstituted phenyl radical or a phenyl radical substituted by 1 or 2 alkyl radicals of 1 to 6 carbon atoms, any cycloalkyl moiety or radical having 5 to 7 ring carbon atoms, R₃ signifies a hydrogen atom, an alkyl radical of 4 to 8 carbon atoms, an unsubstituted phenyl or naphthyl radical or a phenyl or naphthyl radical substituted by up to 2 alkyl radicals of 1 to 6 carbon atoms or by up to two halogen atoms, cyano or nitro groups, X signifies

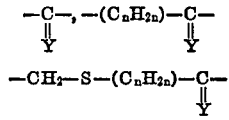

or
where
Y signifies an oxygen or sulphur atom and
n signifies 1, 2, 3, 4, 5 or 6, and
M signifies a divalent nickel, zinc, copper or manganese ion.

2. A compound according to Claim 1, of formula I',

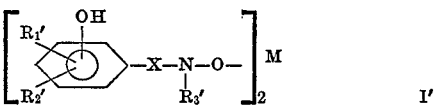

in which
R₁' signifies a tertiary alkyl radical of 4 to 6 carbon atoms,
R₂' signifies a hydrogen atom, an alkyl, alkoxy, unsubstituted phenyl, cycloalkyl, alkylcycloalkyl, cycloalkylalkyl, aralkyl or a mono on disubstituted phenyl radical containing up to 9 carbon atoms, which alkyl, alkoxy, alkylcycloalkyl, cycloalkylalkyl or aralkyl radical contains up to 9 carbon atoms and any cycloalkyl moiety or radical contains 5 to 7 ring carbon atoms,
R₃' signifies a hydrogen atom, an alkyl radical of 4 to 8 carbon atoms, an unsubstituted phenyl or naphthyl radical or a phenyl or naphthyl radical substituted by up to 2 alkyl radicals of 1 to 6 carbon atoms or by up to two chlorine or bromine atoms, cyano or nitro groups, and
X and M are as defined in Claim 1.

3. A compound according to Claim 2 wherein R₂' signifies a hydrogen atom or an alkyl or alkoxy radical which alkyl and alkoxy radicals contain up to 9 carbon atoms.

4. A compound according to Claim 2, of formula I'',

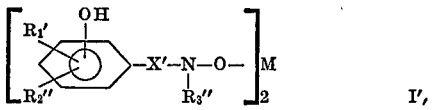

in which
R₁' is as defined in Claim 2,
R₂'' signifies a tertiary alkyl radical of 4 to 6 carbon atoms or a methyl radical,
R₃'' signifies a hydrogen atom or an unsubstituted phenyl radical,
X' signifies

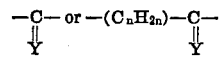

where Y signifies an oxygen or sulphur atom and
n signifies 1, 2, 3, 4, 5, or 6, and
M signifies a divalent nickel, zinc, copper or manganese ion.

5. A compound according to Claim 4 wherein R₁' signifies a tertiary butyl or tertiary amyl radical and R₂'' signifies a tertiary butyl, tertiary amyl or a methyl radical.

6. A compound according to Claim 5, wherein R₁' signifies a tertiary butyl radical and R₂'' signifies a tertiary butyl radical or a methyl radical.

7. A compound according to Claim 4, wherein n signifies 1 or 2.

8. A compound according to Claim 5, wherein n signifies 1 or 2.

9. A compound according to Claim 6, in which n signifies 1 or 2.

10. A compound according to Claim 6, of formula I'''

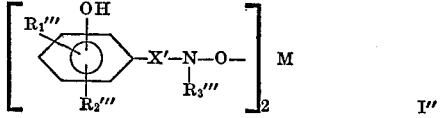

in which
R₁''' and R₂''' are the same and each signifies a tertiary butyl radical,
R₃''' signifies a hydrogen atom or an unsubstituted phenyl radical,
X' signifies

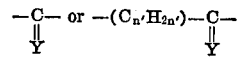

where y signifies an oxygen or sulphur atom and
n' signifies 1 or 2, and
M signifies a divalent nickel, zinc, copper or manganese ion.

11. A compound according to Claim 1, of formula

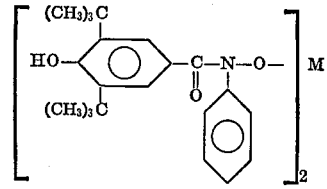

wherein M is as defined in Claim 1.

12. A compound according to Claim 11, wherein M signifies a divalent nickel ion.

13. A compound according to Claim 1, of formula

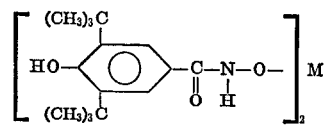

wherein M is as defined in Claim 1.

14. A compound according to Claim 13, wherein M signifies a divalent nickel ion.

15. A compound according to Claim 1, of formula

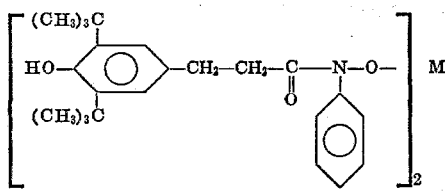

wherein M is as defined in Claim 1.

16. A compound according to Claim 15, wherein M signifies a divalent nickel ion.

17. A compound according to Claim 1, of formula

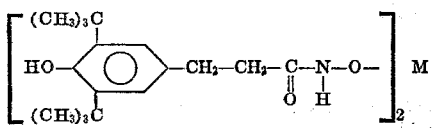

wherein M is as defined in Claim 1.

18. A compound according to Claim 17, wherein M signifies a divalent nickel ion.

19. A compound according to Claim 1, in which M signifies a divalent nickel ion.

References Cited
UNITED STATES PATENTS

| 3,488,368 | 1/1970 | Spivack | 260—429 R |
| 3,647,841 | 3/1972 | Kauder | 260—439 R |
| 3,723,489 | 3/1973 | Dexter et al. | 260—429 R |

FOREIGN PATENTS 1,343,984  10/1963  France.

OTHER REFERENCES

Yale, Chemical Reviews, 33 (1943), pp. 241–242.
Mizukami et al., Chem. Pharm. Brell 14(11) 1249–1252.
Jensen et al., Acta Chem. Scand. 21 (1967), pp. 1936, 1937, 1940.

DANIEL E. WYMAN, Primary Examiner
A. P. DEMERS, Assistant Examiner

U.S. Cl. X.R.

260—45.75 R, 45.75 C, 45.75 N, 45.9 R, 429 R, 429 J, 429.9, 438.1, 500.5 H, 551 R, 559 R